United States Patent
Kankaanpää et al.

(10) Patent No.: US 10,516,823 B2
(45) Date of Patent: *Dec. 24, 2019

(54) CAMERA WITH MOVEMENT DETECTION

(71) Applicant: Microsoft Technology Licensing, LLC, Redmond, WA (US)

(72) Inventors: Esa Kankaanpää, Hyvinkää (FI); Shahil Soni, Espoo (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/856,047

(22) Filed: Dec. 27, 2017

(65) Prior Publication Data

US 2018/0124316 A1    May 3, 2018

Related U.S. Application Data

(63) Continuation of application No. 14/884,299, filed on Oct. 15, 2015, now Pat. No. 9,888,174.

(51) Int. Cl.
*G06T 7/80*    (2017.01)
*H04N 5/232*    (2006.01)
(Continued)

(52) U.S. Cl.
CPC ......... *H04N 5/23238* (2013.01); *G06F 3/013* (2013.01); *G06T 7/20* (2013.01);
(Continued)

(58) Field of Classification Search
CPC ........... H04N 5/23238; H04N 5/23293; H04N 5/23264; H04N 5/23258; H04N 5/2254;
(Continued)

(56) References Cited

U.S. PATENT DOCUMENTS 5,844,599 A    12/1998  Hildin
6,241,609 B1    6/2001  Rutgers
(Continued)

FOREIGN PATENT DOCUMENTS

CN    102355545 A    2/2012
CN    202455444 U    9/2012
(Continued)

OTHER PUBLICATIONS

"Applications of 360 Degree Cameras", Available at: http://www.cs.columbia.edu/CAVE/projects/app_cam_360/, May 13, 2006, 3 Pages.
(Continued)

*Primary Examiner* — Shan E Elahi (57) ABSTRACT

An omnidirectional camera is presented. The camera comprises: at least one lens coupled to an image sensor, a controller coupled to the image sensor, and a movement detection element coupled to the controller. The movement detection element is configured to detect a speed and direction of movement of the camera, the camera is configured to capture images via the at least one lens coupled to the image sensor, and the controller is configured to select a digital viewpoint in the captured images. A central point of the digital viewpoint is selected on the basis of direction of movement, and a field of view of the digital viewpoint is based on the speed of movement. A system and method are also presented.

20 Claims, 3 Drawing Sheets

(51) Int. Cl.
  *G06T 7/20* (2017.01)
  *H04N 5/225* (2006.01)
  *G06F 3/01* (2006.01)
  *G06T 7/70* (2017.01)

(52) U.S. Cl.
  CPC .................. *G06T 7/70* (2017.01); *G06T 7/80* (2017.01); *H04N 5/2254* (2013.01); *H04N 5/23258* (2013.01); *H04N 5/23264* (2013.01); *H04N 5/23293* (2013.01); *G06T 2207/30244* (2013.01)

(58) Field of Classification Search
  CPC .... G06T 7/80; G06T 7/70; G06T 7/20; G06T 2207/30244; G06F 3/013
  USPC ........................................................ 348/37
  See application file for complete search history.

(56) References Cited

U.S. PATENT DOCUMENTS

| | | | |
|---|---|---|---|
| 6,466,254 B1 | 10/2002 | Furlan et al. | |
| 6,577,333 B2 | 6/2003 | Tai et al. | |
| 6,611,282 B1* | 8/2003 | Trubko | G02B 13/06 348/36 |
| 7,940,299 B2 | 5/2011 | Geng | |
| 7,969,472 B2 | 6/2011 | Biegelsen et al. | |
| 7,999,842 B1 | 8/2011 | Barrus et al. | |
| 8,154,583 B2 | 4/2012 | Kurtz et al. | |
| 8,248,448 B2 | 8/2012 | Feng et al. | |
| 8,269,833 B2 | 9/2012 | Vorobiev | |
| 8,274,544 B2 | 9/2012 | Kurtz et al. | |
| 8,289,363 B2 | 10/2012 | Buckler | |
| 8,355,041 B2 | 1/2013 | Chen et al. | |
| 8,358,328 B2 | 1/2013 | Friel et al. | |
| 8,390,667 B2 | 3/2013 | Mauchly et al. | |
| 8,416,247 B2 | 4/2013 | Zalewski | |
| 8,587,634 B1 | 11/2013 | Baldino et al. | |
| 8,624,716 B2 | 1/2014 | Englander | |
| 8,736,680 B1 | 5/2014 | Cilia et al. | |
| 8,773,499 B2 | 7/2014 | Watson et al. | |
| 8,842,161 B2 | 9/2014 | Feng et al. | |
| 8,855,369 B2 | 10/2014 | Kikkeri et al. | |
| 8,860,780 B1 | 10/2014 | Davey et al. | |
| 8,929,587 B2 | 1/2015 | Izzat et al. | |
| 8,957,940 B2 | 2/2015 | Tian | |
| 8,964,029 B2 | 2/2015 | Finn et al. | |
| 8,964,054 B2* | 2/2015 | Jung | H04N 5/232 348/211.11 |
| 9,041,826 B2* | 5/2015 | Jung | H04N 1/2166 348/221.1 |
| 9,224,060 B1 | 12/2015 | Ramaswamy | |
| 9,487,159 B2* | 11/2016 | Achenbach | B60R 11/04 |
| 9,560,274 B2 | 1/2017 | Hirata et al. | |
| 9,621,749 B2* | 4/2017 | Jung | H04N 1/00352 |
| 9,729,788 B2 | 8/2017 | Furumura et al. | |
| 9,741,236 B2* | 8/2017 | Hess | G08B 25/008 |
| 9,888,174 B2 | 2/2018 | Kankaanpaa et al. | |
| 9,930,270 B2 | 3/2018 | Soni et al. | |
| 2002/0030734 A1* | 3/2002 | Smith | H04N 5/23238 348/36 |
| 2002/0191071 A1 | 12/2002 | Rui et al. | |
| 2003/0023598 A1 | 1/2003 | Janakiraman et al. | |
| 2003/0071216 A1* | 4/2003 | Rabolt | G01J 3/02 250/339.02 |
| 2003/0081952 A1* | 5/2003 | Geng | G03B 17/00 396/427 |
| 2003/0234866 A1 | 12/2003 | Cutler | |
| 2004/0057622 A1* | 3/2004 | Bradski | G06K 9/00597 382/217 |
| 2004/0085335 A1 | 5/2004 | Burlnyk et al. | |
| 2004/0150515 A1 | 8/2004 | Kallhammer et al. | |
| 2004/0246333 A1 | 12/2004 | Steuart, III | |
| 2005/0029458 A1* | 2/2005 | Geng | G08B 13/19608 250/347 |
| 2005/0104999 A1* | 5/2005 | Wada | H04N 13/239 348/373 |
| 2006/0004512 A1 | 1/2006 | Herbst et al. | |
| 2006/0072216 A1* | 4/2006 | Krogmann | G02B 13/06 359/725 |
| 2006/0187305 A1 | 8/2006 | Trivedi et al. | |
| 2007/0003277 A1* | 1/2007 | Stapleton | G03B 17/561 396/544 |
| 2007/0040928 A1* | 2/2007 | Jung | H04N 1/2166 348/362 |
| 2007/0052856 A1* | 3/2007 | Jung | H04N 1/2166 348/565 |
| 2007/0109411 A1* | 5/2007 | Jung | H04N 1/00132 348/207.1 |
| 2007/0260684 A1 | 11/2007 | Sharma et al. | |
| 2007/0274563 A1* | 11/2007 | Jung | H04N 1/00352 382/103 |
| 2008/0043108 A1* | 2/2008 | Jung | H04N 5/232 348/207.1 |
| 2008/0106625 A1* | 5/2008 | Border | H04N 5/35572 348/296 |
| 2008/0122922 A1 | 5/2008 | Geng | |
| 2008/0239080 A1 | 10/2008 | Moscato | |
| 2009/0037826 A1 | 2/2009 | Bennetts | |
| 2009/0251530 A1 | 10/2009 | Cilia | |
| 2010/0118116 A1 | 5/2010 | Tomasz et al. | |
| 2010/0191459 A1 | 7/2010 | Carter et al. | |
| 2010/0315215 A1* | 12/2010 | Yuda | H04N 5/2259 340/435 |
| 2011/0128350 A1 | 6/2011 | Oliver et al. | |
| 2011/0204461 A1* | 8/2011 | Lee | H01L 27/14621 257/432 |
| 2012/0069131 A1 | 3/2012 | Abelow | |
| 2012/0069134 A1 | 3/2012 | Garcia et al. | |
| 2012/0135803 A1 | 5/2012 | Nonaka et al. | |
| 2012/0163657 A1 | 6/2012 | Shellshear | |
| 2012/0182392 A1 | 7/2012 | Kearns et al. | |
| 2012/0206565 A1 | 8/2012 | Villmer | |
| 2012/0210221 A1 | 8/2012 | Khan et al. | |
| 2012/0236112 A1 | 9/2012 | Cilia | |
| 2012/0286951 A1* | 11/2012 | Hess | G08B 25/008 340/539.1 |
| 2012/0314015 A1 | 12/2012 | Watson et al. | |
| 2012/0320143 A1 | 12/2012 | Chu et al. | |
| 2013/0002809 A1* | 1/2013 | Shimizu | G06T 3/0062 348/38 |
| 2013/0022232 A1 | 1/2013 | Jacob et al. | |
| 2013/0069883 A1* | 3/2013 | Oga | G06F 1/1615 345/172 |
| 2014/0153916 A1 | 6/2014 | Kintner | |
| 2014/0267595 A1 | 9/2014 | Cuddeback | |
| 2014/0267727 A1 | 9/2014 | Alaniz | |
| 2014/0270343 A1 | 9/2014 | Sanaullah et al. | |
| 2014/0294246 A1 | 10/2014 | Osamura et al. | |
| 2015/0022674 A1 | 1/2015 | Blair et al. | |
| 2015/0092060 A1 | 4/2015 | Felt | |
| 2015/0135238 A1 | 5/2015 | Wickenkamp | |
| 2015/0178953 A1 | 6/2015 | Gao et al. | |
| 2015/0179219 A1 | 6/2015 | Gao et al. | |
| 2015/0324636 A1* | 11/2015 | Bentley | G11B 27/17 386/227 |
| 2016/0063710 A1 | 3/2016 | Tanaka | |
| 2016/0249039 A1* | 8/2016 | Tran | G06T 7/593 |
| 2017/0111579 A1 | 4/2017 | Kankaanpaa et al. | |
| 2017/0111595 A1 | 4/2017 | Soni et al. | |
| 2017/0127008 A1 | 5/2017 | Kankaanpaa et al. | |
| 2017/0134714 A1 | 5/2017 | Soni et al. | |
| 2017/0197656 A1 | 7/2017 | Oh | |
| 2017/0270715 A1* | 9/2017 | Lindsay | G06F 3/011 |
| 2017/0339341 A1 | 11/2017 | Zhou et al. | |
| 2018/0247505 A1 | 8/2018 | Arai et al. | |
| 2019/0230307 A1 | 7/2019 | Kankaanpaa et al. | |

FOREIGN PATENT DOCUMENTS

| | | |
|---|---|---|
| CN | 103268610 A | 8/2013 |
| CN | 104012106 A | 8/2014 |

(56) References Cited

FOREIGN PATENT DOCUMENTS

| EP | 2887323 A1 | 6/2015 |
|---|---|---|
| EP | 2927885 A1 | 10/2015 |
| GB | 2456802 A | 7/2009 |
| JP | 2015015583 A | 1/2015 |
| WO | 2009066988 A2 | 5/2009 |
| WO | 2009097449 A1 | 8/2009 |
| WO | 2011130117 A1 | 10/2011 |
| WO | 2013185238 A1 | 12/2013 |

OTHER PUBLICATIONS

"Autodome Camera Family", Available at: http://resource.boschsecurity.us/documents/AUTODOME_Commercial_Brochure_enUS_12346092939.pdf, Jul. 2014, 12 Pages.

"Kolar GoPro", Available at: http://www.kolor.com/, Aug. 4, 2015, 6 pages.

"Non-Final Office Action Issued in U.S. Appl. No. 14/883,952", dated May 22, 2017, 22 Pages.

"Non-Final Office Action Issued in U.S. Appl. No. 14/926,854", dated Feb. 8, 2018, 19 Pages.

"Final Office Action Issued in U.S. Appl. No. 14/938,606", dated May 30, 2018, 14 Pages.

"Non-Final Office Action Issued in U.S. Appl. No. 14/938,606", dated Nov. 17, 2017, 12 Pages.

Chen, et al., "Personalized Production of Basketball Videos From Multi-Sensored Data Under Limited Display Resolution", In the Computer Vision and Image Understanding, vol. 114, No. 6, Jun. 30, 2010, pp. 667-680.

Inoue, et al., "Effects of Video Expression in Video Conferencing", In the Proceedings of the 32nd Annual Hawaii International Conference in Systems Sciences, 1999, 8 Pages.

Patil, et al., "People Detection and Tracking in High Resolution Panoramic Video Mosaic", In Proceedings of IEEE RSJ International Conference on Intelligent Robots and Systems, Sep. 28, 2004, 6 pages.

"International Preliminary Report on Patentability Issued in PCT Application No. PCT/US2016/052379", dated Sep. 13, 2017, 7 Pages.

"International Search Report and Written Opinion Issued in PCT Application No. PCT/US2016/052379", dated Nov. 9, 2016, 11 Pages.

"International Preliminary Report on Patentability Issued in PCT Application No. PCT/US2016/058333", dated Jan. 23, 2018, 7 Pages.

"International Search Report and Written Opinion Issued in PCT Application No. PCT/US2016/058333", dated Dec. 19, 2016, 12 Pages.

"Second Written Opinion Issued in PCT Application No. PCT/US2016/058333", dated Sep. 20, 2017, 6 Pages.

"International Search Report and Written Opinion Issued in PCT Application No. PCT/US2016/060739", dated Feb. 16, 2017, 10 Pages.

Ranjan, et al., "Automatic Camera Control Using Unobtrusive Vision and Audio Tracking", In Proceedings of Conference on the Graphics Interface, May 31, 2010, 8 pages.

Roberts, Mary Rose, "New 360-degree hand-held Camera shows Promise for Law Enforcement", Available at: https://www.policeone.com/police-products/body-cameras/articles/7329287-New-360-degree-hand-held-camera-shows-promise-for-law-enforcement/, Jun. 27, 2014, 4 Pages.

Sima, Claudia, "Richo Launches the Theta M15 Omnidirectional Camera; Allows Video Recording at 360 Degrees", Available at: https://www.gsmdome.com/richo-launches-theta-m15-omnidirectional-camera-allows-video-recording-360-degrees, Nov. 1, 2014, 3 Pages.

Sun, et al., "Region of Interest Extraction and Virtual Camera Control Based on Panoramic Video Capturing", In Journal of IEEE Transactions on Multimedia, vol. 7, Issue 5, Oct. 2005, 2 Pages.

"Non Final Office Action Issued in U.S. Appl. No. 14/938,606", dated Sep. 28, 2018, 16 Pages.

"Non Final Office Action Issued in U.S. Appl. No. 14/884,299", dated Jun. 1, 2017, 16 Pages.

"Notice of Allowance Issued in U.S. Appl. No. 14/884,299", dated Sep. 27, 2017, 11 Pages.

"Notice of Allowance Issued in U.S. Appl. No. 14/884,299", dated Nov. 24, 2017, 2 Pages.

Kimber, et al., "Fly About: Spatially Indexed Panoramic Video", In Proceedings of the Ninth ACM International Conference on Multimedia, Sep. 30, 2001, pp. 339-347.

"International Search Report & Written Opinion Issued in PCT Application No. PCT/US2016/055094", dated Jan. 10, 2017, 13 Pages.

"Second Written Opinion Issued in PCT Application No. PCT/US2016/055094", dated Sep. 11, 2017, 8 Pages.

Wang, et al., "Experiment Research on Electronic Image Stabilization of Omni-directional Camera System", Retrieved From <<https://www.researchgate.net/publication/252049786_Experiment_research_on_electronic_image_stabilization_of_omni-directional_camera_system>>, Sep. 2011, 4 Pages.

Whitwam, et al., "How Google's Self-Driving Cars Detect and Avoid Obstacles", Retrieved From <<http://www.extremetech.com/extreme/189486-how-googles-self-driving-cars-detect-and-avoid-obstacles>>, Sep. 14, 2014, 8 Pages.

"Final Office Action Issued in U.S. Appl. No. 14/938,606", dated Apr. 5, 2019, 16 Pages.

"Office Action Issued in European Patent Application No. 16785027.0", dated Mar. 26, 2019, 9 Pages.

"Notice of Allowance Issued in U.S. Appl. No. 16/374,662", dated Aug. 30, 2019, 19 Pages. (MS# 358016-US-CNT).

"Final Office Action Issued in U.S. Appl. No. 14/938,606", dated Sep. 6, 2019, 15 Pages. (MS# 358147-US-NP).

"First Office Action and Search Report Issued in Chinese Patent Application No. 201680060294.4", dated Oct. 8, 2019, 13 Pages. (MS# 358008-CN-PCT).

"First Office Action and Search Report Issued in Chinese Patent Application No. 201680066226.9", dated Sep. 30, 2019, 18 Pages. (MS# 358147-CN-PCT).

* cited by examiner

CAMERA WITH MOVEMENT DETECTION

CROSS-REFERENCE TO RELATED APPLICATION

The present application is a continuation of U.S. application Ser. No. 14/884,299 filed on Oct. 15, 2015 and is hereby incorporated by reference herein for all intents and purposes.

BACKGROUND

Omnidirectional cameras which cover a 360-degree image in the horizontal pane, or both in horizontal and vertical panes, have been used in panoramic imaging and video recording. The images and videos recorded by such cameras can be played back by consumer electronic devices, and normally the device user is given control over which segment of the 360 frame is displayed. This can be done by manipulating the viewpoint during playback.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

A camera, system and method are presented. The camera captures omnidirectional images or video, and automatically selects a digital viewpoint within those images or video based on direction and speed of movement of the camera. The system includes the camera that can be attached to an object, for example a car or a person; and the method is for selecting a digital viewpoint in a video by determining a central point and field of view of the same, based on movement parameters.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

DETAILED DESCRIPTION

The detailed description provided below in connection with the appended drawings is intended as a description of the embodiments and is not intended to represent the only forms in which the embodiments may be constructed or utilized. The description sets forth the structural basis, functions and the sequence of operation steps. However, the same or equivalent functions and sequences may be accomplished by different embodiments not listed below.

Although some of the present embodiments may be described and illustrated herein as being implemented in an omnidirectional video camera, these are only examples of a device and not a limitation. As those skilled in the art will appreciate, the present embodiments are suitable for application in a variety of different types of devices incorporating a digital image capture unit or a digital imaging system, for example, a stand-alone digital camera device, e.g. a compact camera, a SLR (Single-Lens Reflex) camera, a mirrorless interchangeable-lens camera, or a stationary camera, as long as the digital imaging system is capable of capturing an image with wider field of view than what is displayed on a display device. The omnidirectional field of view may be partially blocked by the camera body. The omnidirectional camera can have a field of view over 180 degrees. The camera may have different form factors; for example, it may be a flat device with a large display, a spherical element or a baton comprising a camera element.

Figure 1:
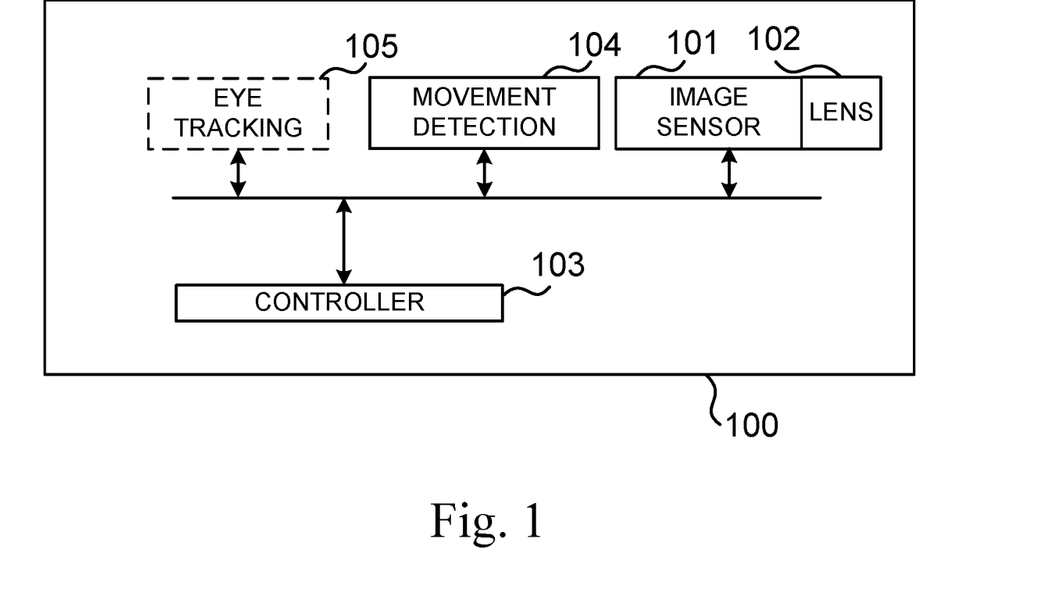
FIG. 1 is a schematic illustration of the main components of a camera according to an embodiment.

FIG. 1 shows a block diagram of an embodiment of an omnidirectional camera 100. The camera 100 may be any camera adapted to capture omnidirectional images and/or video, or a wide-angle camera which can capture at least 180 degree of horizontal and vertical field of view. For example, the camera 100 may be a 360-degree camera implemented as a stand-alone digital camera device with two lenses, or the camera 100 may be implemented e.g. in a smartphone, a tablet computer, as a wearable camera or a web camera. The camera 100 can have any shape and design, and embodiments are illustrated by structural elements in FIG. 1.

The omnidirectional camera 100 comprises at least one lens 102 coupled to an image sensor 101, a controller 103 coupled to the image sensor 101, and a movement detection element 104 coupled to the controller 103. The movement detection element 104 may comprise a motion sensor, a rotation detector, and/or an additional camera for detecting motion of the camera. In an embodiment, the at least one lens 102 coupled to the image sensor 101 can be supplemented with at least one mirror configured to reflect a panoramic image into the lens 102. In an embodiment, the camera 100 comprises two or more lenses 102 coupled to image sensors 101, wherein these pairs are also coupled to the controller 103. The plurality of optical elements in this embodiment can provide images to the controller 103 which, when combined, create an omnidirectional image. In an embodiment, when two or more lenses 102 with image sensors 101 are used, the camera is configured to capture a horizontally and vertically omnidirectional panoramic image. The image sensors 101 can comprise a charge-coupled device (CCD) sensor or a complementary metal-oxide-semiconductor (CMOS) sensor.

The movement detection element 104 is configured to detect a speed and direction of movement of the camera 100. In an embodiment, the camera 100 may comprise a fastening element not shown on FIG. 1, which makes it possible to fix the camera 100 to a moving object.

The camera 100 is configured to capture images via the lens 102 onto the image sensor 101 and to provide the captured images to the controller 103. If the camera 100 is a photo camera, the framerate may be between 1 and 10 images per second; if the camera 100 is a video camera, the framerate may be between 10 and 120 images per second. Higher framerates are also possible if, for example, the camera 100 is designed to capture high frame-rate video suitable for slow motion playback.

The controller 103 is configured to select a digital viewpoint in the captured images. A digital viewpoint is a segment of the captured omnidirectional image that is displayed. A central point of the digital viewpoint is selected based on the direction of movement, for example so that the digital viewpoint "faces" the movement direction. A field of view (FoV) of the digital viewpoint is selected based on the speed of movement. The field of view of a digital viewpoint can be defined as an angle which determines width of the segment of the captured omnidirectional image that is displayed. This is explained in relation to FIGS. 3a-3b.

In an embodiment, the controller 103 is further configured to adjust the central point of the digital viewpoint as the direction of movement changes, and change the field of view as the speed of movement changes: narrow the FoV when the speed increases, and widen the FoV when the speed decreases.

In an embodiment, the controller 103 is configured to perform the above operations in real time while a video or a sequence of images is being captured. The controller 103 may also be configured to record the digital viewpoint selection as part of data related to the captured video or sequence of images. This data may be recorded as a metadata that is saved in the memory with the captured image or video. The metadata is for example an XML file comprising multiple regions of interest, or digital viewpoints, with time data corresponding to the captured video. In one embodiment the image or the video is combined into a single file with the information of digital viewpoint selection. When the video is played, the digital viewpoint is displayed in the video stream by default and the viewer of the video may follow the viewpoint as recorded according to the metadata. The viewer may choose to view other directions than the digital viewpoint in the omnidirectional image or video. In an embodiment, the viewer may be restricted from any variation of the viewpoint except slight shifting to avoid an unpleasant viewing experience of high-speed footage.

According to an embodiment, the camera 100 also comprises a gaze detection element 105 which is configured to monitor the gaze direction of a camera user. The controller 103 can select a central point of the digital viewpoint additionally based on the gaze direction. The gaze detection element 103 can be an eye tracker or a face detection element. It is illustrated in a dashed box as an optional feature.

In an embodiment, the controller 103 is configured to select the central point of the digital viewpoint based on the direction of movement only after a pre-defined speed threshold has been reached. If the camera 100 comprises a gaze detection element 105, the camera 100 can keep track of where the user is looking, and maintain the central point of the digital viewpoint facing the same direction until a pre-defined speed threshold has been exceeded. The controller 103 can also be configured to prioritize the direction of a user's gaze for a short period of time, and then return the central point to the direction of movement. This can provide real-time editing of the captured video by the user of the camera 100.

In an embodiment, the camera 100 comprises an image stabilization element. This element is configured to stabilize the omnidirectional view, for example by keeping the omnidirectional view in horizontal plane regardless of the orientation of the camera 100, or keeping the digital viewpoint directed towards a certain point while absorbing camera shake. The image stabilization element may be implemented partially by the operating system of the camera; it may be implemented by hardware or partially by hardware and embedded software.

In an embodiment, the camera 100 comprises an accelerometer coupled to the controller 103. The camera 100 may also comprise other inertial navigation systems (INS), such as gyroscope, also connected to the controller 103. In an embodiment, the controller 103 is configured to adjust the orientation of the digital viewpoint based on the reading of the mentioned INS. For example, if the camera 100 is tilted, the reading can provide information on the angle by which the digital viewpoint should be adjusted for a more pleasant viewing experience.

According to an embodiment, the camera 100 is configured to record the captured images or video at a higher resolution within the digital viewpoint than outside of the digital viewpoint of every frame.

The above embodiments have a technical effect of providing an omnidirectional video or images with meaningful viewpoints. This can be useful for example in capturing and editing videos or images taken by an omnidirectional camera mounted on a high-speed moving object or person.

Figure 2:
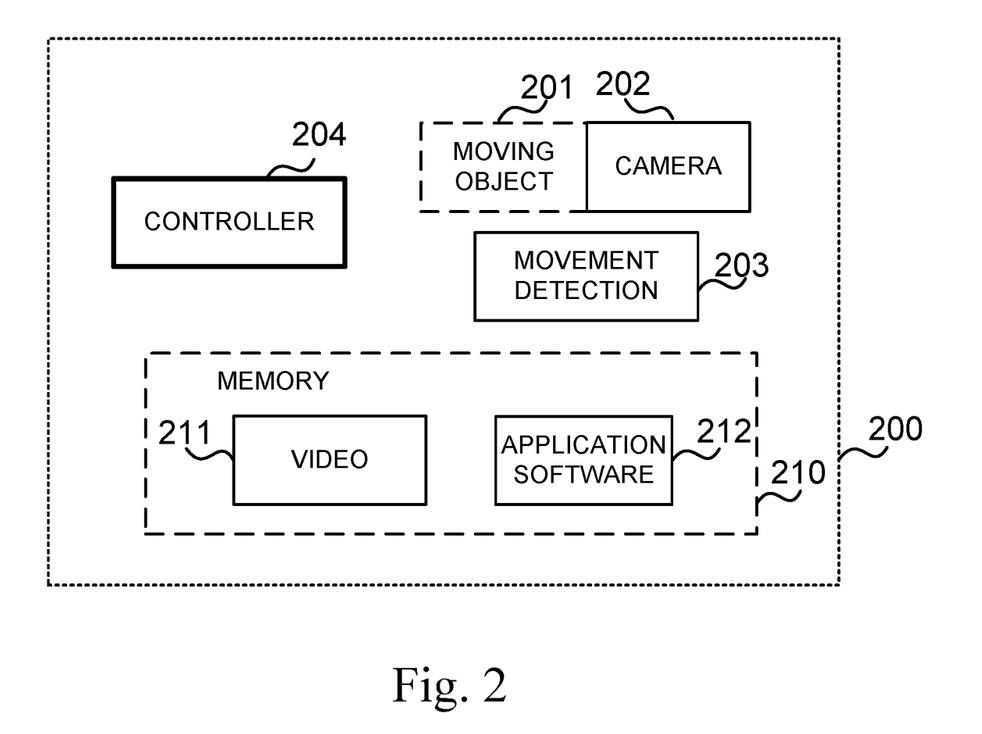
FIG. 2 is a schematic illustration of a system according to an embodiment.

FIG. 2 shows a block diagram of a system 200 according to an embodiment. The system 200 comprises a moving camera 202 attached to it. The movement may be caused by the camera being attached to a moving object 201 that can be a vehicle, a person, an animal or any other object on which a camera 202 may be mounted. The camera 202 may be an omnidirectional camera or any other type of camera which can capture wide-angle videos in which a digital viewpoint with a more convenient field of view may be selected. The camera 202 comprises at least one lens coupled to an image sensor and is configured to capture images and/or video.

The system 200 comprises a movement detection unit 203 which can be integrated into the camera 202, or implemented as a standalone device. The unit 203 detects speed and direction of movement of the camera 202.

The system 200 also comprises a controller 204 coupled to the camera 202 and the movement detection unit 203. The controller 204 can be integrated into the camera 202, or implemented as a standalone device. The controller 204 controls the operation of the movement detection unit 203 and the camera 202. The controller 204 is configured to select a digital viewpoint in the captured images, wherein a central point of the digital viewpoint is based on the direction of movement; and a field of view of the digital viewpoint is based on the speed of movement, and both parameters are received from the movement detection unit 203.

Operation of the system 200 is similar to the camera 100 illustrated on FIG. 1. Elements of the system 200 may be implemented as separate devices, or some of them may form an intermediate device. The elements coupled to the control unit 203 can have a rigid, wired or wireless connection.

The system 200 may also comprise a memory 210 configured to store or temporarily store the captured images and/or video. It is shown with a dashed line as an optional element. The memory 210 may also store application software 212 and an operating system (not shown), and may be implemented in a hardware of the system or on a cloud.

The controllers 103, 204 of the device 100 and system 200 may comprise one or more processors which may be microprocessors for processing computer executable instructions to control the operation of the devices 100 and system 200. Platform software comprising an operating system or any other suitable platform software may be provided to enable application software to be executed on the device.

Computer executable instructions may be provided using any computer-readable media that is accessible by the device 100 and system 200. Computer-readable media may include, for example, computer storage media such as memory and communications media. Computer storage media, such as memory 210, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 210) is shown within the device 100 and system 200 it will be appreciated that the storage may be distributed or located remotely and accessed via a network or other communication link.

At least some of the embodiments disclosed in FIGS. 1-2 can provide reduced time required to edit an omnidirectional video or image, and improve user experience during playback by providing one or more default digital viewpoint.

Figure 3A:
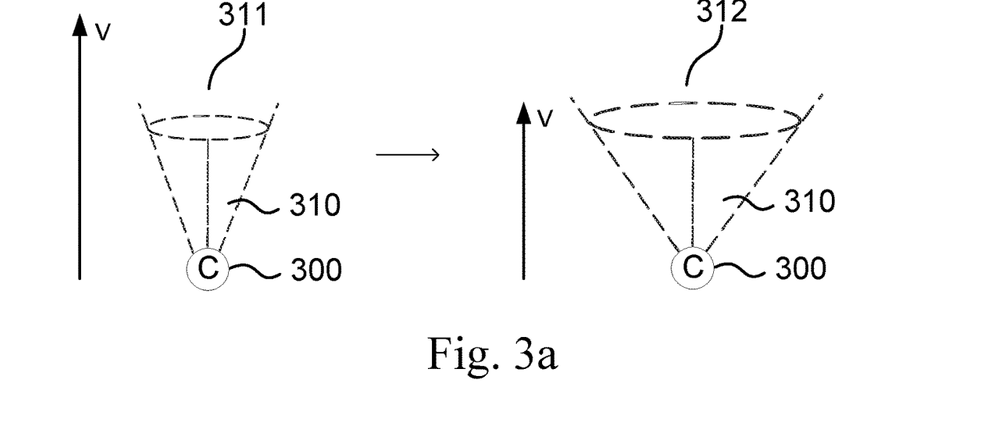
FIG. 3a is a schematic top-down view of FoV adjustment during movement according to an embodiment.
Figure 3B:
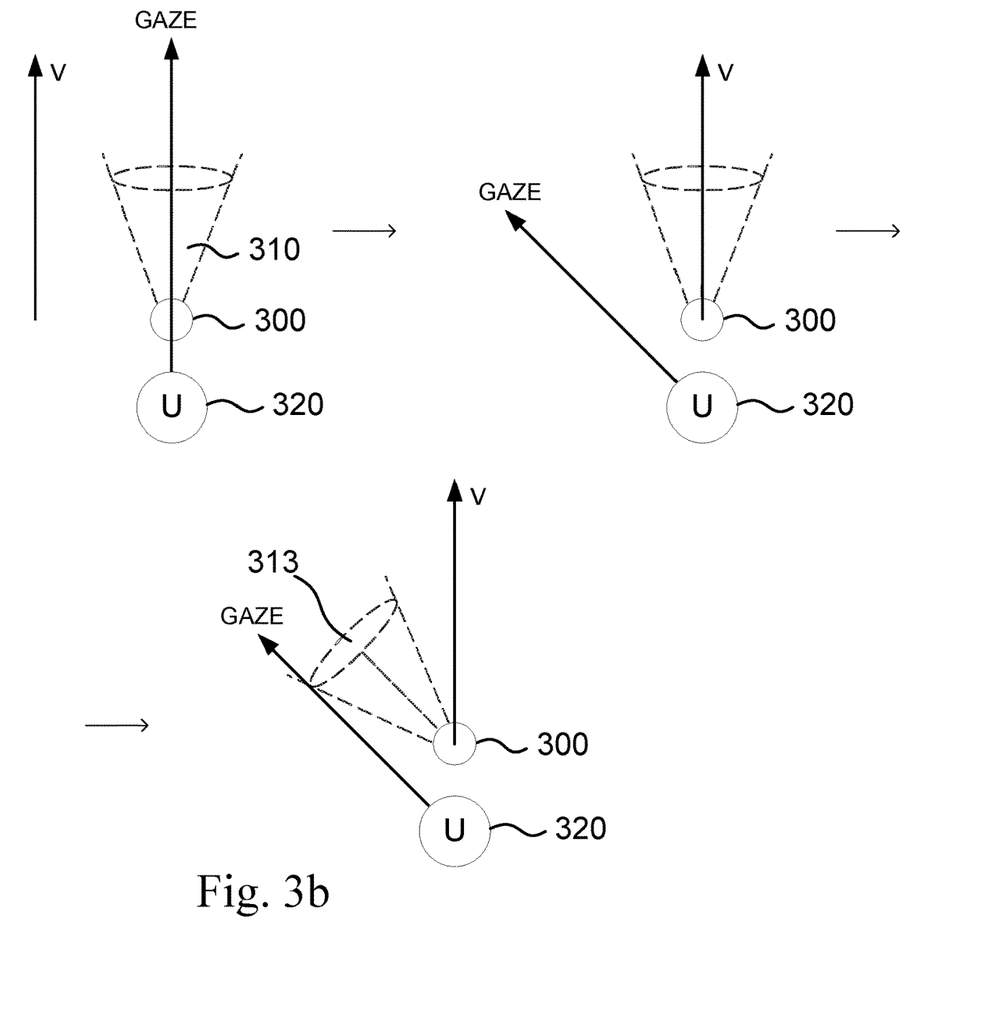
FIG. 3b is a schematic top-down view of central point adjustment during movement according to an embodiment.

FIGS. 3a-3b illustrate the selection and definition of a central point and field of view of the digital viewpoint of a camera 300 based on the movement and gaze parameters by the controller. These figures are a schematic top view of the moving camera 300. On FIG. 3a, the camera 300 marked by letter C moves in the direction of the speed vector V, and the controller selects a central point of the digital viewpoint 310 to match the direction of movement. In an embodiment, the controller may be configured to select a different default central point which does not coincide but rather correlates with the speed vector V. For example, the central point of the digital viewpoint 310 may be facing a direction opposite to the direction of movement; or the viewpoint may be oriented towards the horizon while the movement direction vertically is downward or upward.

As shown in FIG. 3a, when the speed decreases and the speed vector V is demonstrated to be shorter, the field of view can increase from 311 to 312 to capture more details of the surrounding scenery at a lower speed.

In FIG. 3b, an adjustment of the central point based on gaze of a camera user 320 is shown. The user 320 is indicated by U. The camera 300 comprises a gaze detection element (not shown) which is configured to detect when a user's 320 gaze switches somewhere away from a pre-defined set of directions, for a sufficient amount of time. The threshold time a user 320 looks away from the movement direction may be between 0, 1 to 10 seconds, depending on the scenario. After the threshold time passes, the controller of the camera 300 is configured to define an additional central point of view for the digital viewpoint 313. The controller can be configured to temporarily move the default digital point of view to the additional central point, or allow the user to select between the primary and additional digital viewpoints during playback.

Figure 4:
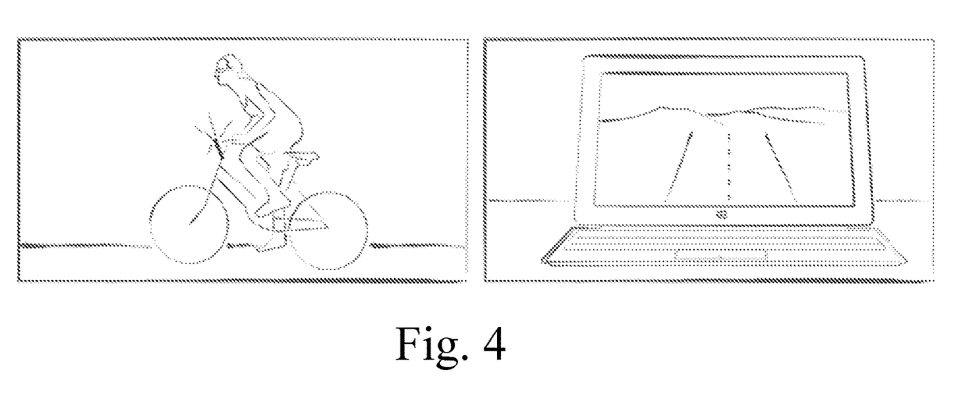
FIG. 4 is a graphic illustration of an embodiment.

FIG. 4 is a simple illustration of an embodiment. As it is clear to a skilled person, this embodiment is presented for exemplary purposes only and is not to be interpreted as limiting. In this case, an omnidirectional video camera is attached to a bicycle handlebar, as shown on the left half of the figure. While the camera attached to the bicycle at low speed or stationary, it is configured to capture footage from the surroundings and either not focus the viewpoint on any "view", provide a broad field of view, or determine the default field of view by other means. When the bike is in motion, however, the field of view focuses on the direction of movement. Playback of the video captured by this camera, in default selected field of view, is illustrated on the right half of FIG. 4.

Figure 5:
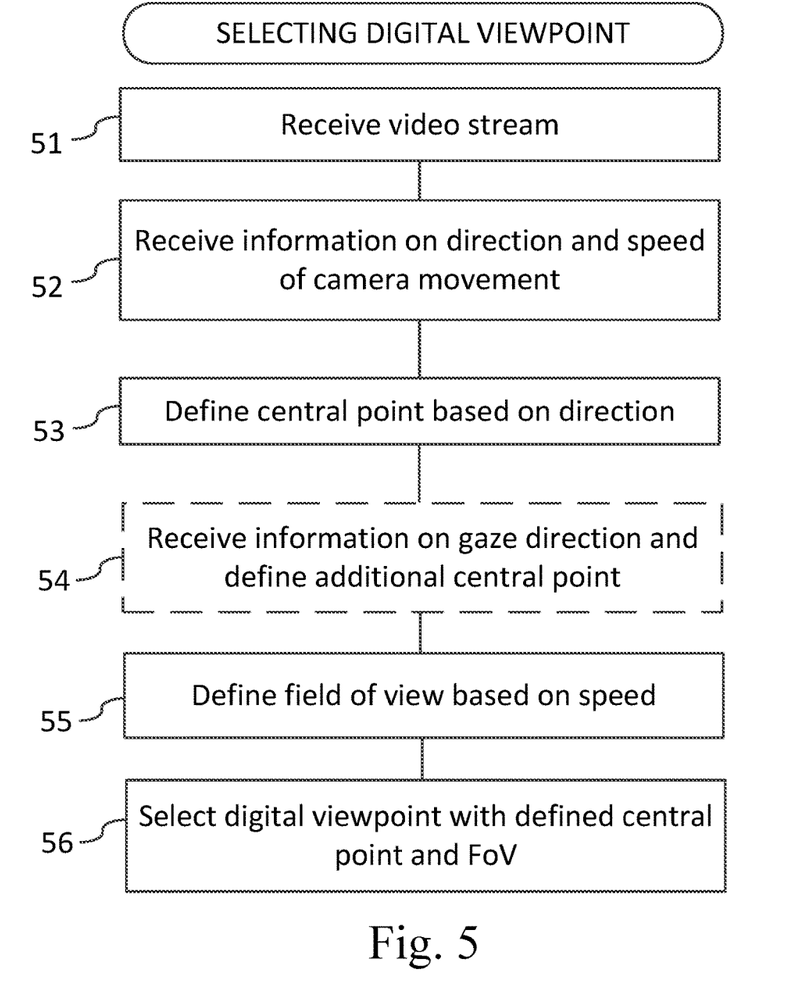
FIG. 5 is a block diagram of a method according to an embodiment.

FIG. 5 shows a method for selecting a digital viewpoint in an omnidirectional video. The method can be performed by a controller. In an embodiment, the method is carried out in "real time" as the video is being shot. The method comprises: receiving 51 a video stream from a moving camera, receiving 52 a signal with information including speed and direction of movement of the camera, defining 53 a central point in the received video stream based on the direction of movement of the camera, so that the central point faces the direction of movement in the video. The method further comprises defining 55 a field of view based on the speed of movement of the camera, and selecting 56 a digital viewpoint in the received video stream with the defined central point and the defined field of view. The field of view may be narrowed when the movement speed increases, and widened when the speed decreases.

The method can also comprise an optional step of receiving 54 a signal from a gaze detection element, wherein the signal comprises information about gaze direction of a camera user; and defining an additional central point based on the detected gaze direction. The method can also comprise selecting an additional digital viewpoint in the received video stream with the additional defined central point, and prioritizing between the main and additional digital viewpoints based on predetermined movement parameters. Alternatively, the user may be allowed to switch between digital viewpoints manually when the video is played back.

In an embodiment, the method comprises recording the captured images or video into a memory. In an embodiment, the recorded frames have a higher resolution inside the selected digital viewpoints than outside of them.

The embodiments described above can result in a pre-edited 360 video which comprises a default digital viewpoint and field of view variations that help avoid unpleasant viewer experience for a high speed video.

The methods according to the embodiments above may be performed, for example, by a control unit of the device or a processor.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

According to an aspect, an omnidirectional camera is presented. The camera comprises: at least one lens coupled to an image sensor, a controller coupled to the image sensor, and a movement detection element coupled to the controller; wherein the movement detection element is configured to detect a speed and direction of movement of the camera, the camera is configured to capture images via the at least one lens coupled to the image sensor, the controller is configured to select a digital viewpoint in the captured images, wherein a central point of the digital viewpoint is based on the direction of movement, and a field of view of the digital viewpoint is based on the speed of movement.

In an embodiment, the controller is configured to: select and adjust the central point of the digital viewpoint based on the direction of movement, narrow the field of view of the digital viewpoint when the speed of movement increases, and widen the field of view of the digital viewpoint when the speed of movement decreases.

In an embodiment, alternatively or in addition to the above embodiments, the omnidirectional camera comprises at least two lenses coupled to image sensors, wherein the controller is coupled to each of the image sensors.

In an embodiment, in addition to the above embodiment, the omnidirectional camera is configured to capture a horizontally and vertically omnidirectional panoramic image via the at least two lenses coupled to the image sensors.

In an embodiment, alternatively or in addition to the above embodiments, the omnidirectional camera is configured to capture omnidirectional video footage via the at least one lens coupled to the image sensor.

In an embodiment, in addition to the above embodiment, the selected digital viewpoint in the captured images is a default digital viewpoint for video playback.

In an embodiment, alternatively or in addition to the above embodiments, the omnidirectional camera comprises a gaze detection element configured to detect a gaze direction of a camera user, wherein the controller is configured to select a central point of the digital viewpoint based on the direction of movement and the detected gaze direction.

In an embodiment, alternatively or in addition to the above embodiments, the omnidirectional camera comprises a fastening element configured to attach the camera to a moving object.

In an embodiment, alternatively or in addition to the above embodiments, the omnidirectional camera comprises an accelerometer coupled to the controller.

In an embodiment, in addition to the above embodiment, the omnidirectional camera comprises a gyroscopic element coupled to the controller, wherein the controller is configured to adjust the orientation of the digital viewpoint based on the accelerometer reading and the gyroscopic element reading.

In an embodiment, alternatively or in addition to the above embodiments, the image sensor comprises a charge-coupled device.

In an embodiment, alternatively or in addition to the above embodiments, the image sensor comprises an active pixel sensor.

In an embodiment, alternatively or in addition to the above embodiments, the omnidirectional camera comprises at least one mirror configured to reflect a panoramic image into the at least one lens coupled to the image sensor.

In an embodiment, in addition to the above embodiment, the omnidirectional camera is configured to capture images at a framerate between 5 and 120 frames per second.

According to an aspect, a system is provided. The system comprises: an omnidirectional camera, the omnidirectional camera comprising at least one lens coupled to an image sensor; a controller coupled to the camera, and a movement detection unit coupled to the controller. The movement detection unit is configured to detect a speed and direction of movement of the camera, the camera is configured to capture images via the at least one lens coupled to the image sensor, and the controller is configured to select a digital viewpoint in the captured images, wherein a central point of the digital viewpoint is based on the direction of movement, and a field of view of the digital viewpoint is based on the speed of movement.

In an embodiment, in addition to the above embodiment, the system comprises a gaze detection unit configured to detect a gaze direction of a camera user, wherein the controller is configured to select a central point of the digital viewpoint based on the direction of movement and the detected gaze direction.

In an embodiment, alternatively or in addition to the above embodiments, the controller comprises a processor.

According to an aspect, a method for selecting a digital viewpoint in an omnidirectional video is provided. The method comprises: receiving a video stream from a camera, receiving a signal from a movement detection element, the signal comprising information including speed and direction of movement of the camera, defining a central point in the received video stream based on the direction of movement of the camera, defining a field of view based on the speed of movement of the camera, and selecting a digital viewpoint in the received video stream with the defined central point and the defined field of view.

In an embodiment, defining a field of view based on the speed of movement of the camera comprises narrowing the field of view when the speed of movement increases, and widening the field of view when the speed of movement decreases.

In an embodiment, alternatively or in addition to the above embodiment, the method comprises: receiving a signal from a gaze detection element, the signal comprising information including gaze direction of a camera user defining an additional central point based on the detected gaze direction, and selecting an additional digital viewpoint in the received video stream with the additional defined central point.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the technical effects described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The term 'comprising' is used herein to mean including the method blocks or elements identified, but that such blocks or elements do not comprise an exclusive list and a method or device may contain additional blocks or elements.

It will be understood that the above description is given by way of example only and that various modifications may be made by those skilled in the art. The above specification, embodiments and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A camera, comprising:
   at least one lens coupled to an image sensor,
   a controller coupled to the image sensor, and
   a movement detection element coupled to the controller; wherein
   the movement detection element is configured to detect a speed and direction of movement of the camera, the speed corresponding to a speed of a moving object to which the camera is attached,
   the camera is configured to capture images via the at least one lens coupled to the image sensor,
   the controller is configured to select a digital viewpoint in the captured images, wherein a central point of the digital viewpoint is based on the direction of movement, and a field of view of the digital viewpoint is based on the speed of movement of the moving object as determined from the speed of movement of the camera.

2. The camera as claimed in claim 1, wherein the field of view of the digital viewpoint is an angle which determines a width of the digital viewpoint and the controller is configured to:
   select and adjust the central point of the digital viewpoint based on the direction of movement,
   narrow the field of view of the digital viewpoint when the speed of movement increases, and
   widen the field of view of the digital viewpoint when the speed of movement decreases.

3. The camera as claimed in claim 1, comprising at least two lenses coupled to image sensors, wherein the controller is coupled to each of the image sensors.

4. The camera as claimed in claim 3, configured to capture a horizontally and vertically panoramic image via the at least two lenses coupled to the image sensors.

5. The camera as claimed in claim 1, configured to capture video footage via the at least one lens coupled to the image sensor and the selected digital viewpoint in the captured images is a default digital viewpoint for video playback.

6. The camera as claimed in claim 1, wherein the movement detection element is integrated with the camera.

7. The camera as claimed in claim 1, comprising a gaze detection element configured to detect a gaze direction of a camera user, wherein the controller is configured to select a central point of the digital viewpoint based on the direction of movement and the detected gaze direction only after a pre-defined speed threshold of the moving object has been reached, wherein the controller is further configured to prioritize a direction of a gaze of a user for a period of time and then return the central point to the direction of movement.

8. The camera as claimed in claim 1, comprising a fastening element configured to attach the camera to the moving object and wherein the movement detection element is a motion sensor of the camera.

9. The camera as claimed in claim 1, comprising an accelerometer coupled to the controller.

10. The camera as claimed in claim 9, comprising a gyroscopic element coupled to the controller, the gyroscopic element configured to provide information on an angle by which the digital viewpoint is to be adjusted, wherein the controller is configured to adjust the orientation of the digital viewpoint based on the accelerometer reading and the gyroscopic element reading in real time while video or a sequence of images are being captured, the controller further configured to record the digital viewpoint selection as part of data related to the captured video or sequence of images, the data being recorded as metadata.

11. The camera as claimed in claim 1, wherein the image sensor comprises a charge-coupled device.

12. The camera as claimed in claim 1, wherein the image sensor comprises an active pixel sensor.

13. The camera as claimed in claim 1, comprising at least one mirror configured to reflect a panoramic image into the at least one lens coupled to the image sensor.

14. The camera as claimed in claim 1, configured to capture images at a framerate between 5 and 120 frames per second.

15. A system comprising:
   a camera, the camera comprising at least one lens coupled to an image sensor;
   a controller coupled to the camera, and
   a movement detection unit coupled to the controller; wherein
   the movement detection unit is configured to detect a speed and direction of movement of the camera, the speed corresponding to a speed of a moving object to which the camera is attached, the camera is configured to capture images via the at least one lens coupled to the image sensor, and the controller is configured to select a digital viewpoint in the captured images, wherein a central point of the digital viewpoint is based on the direction of movement, and a field of view of the digital viewpoint is based on the speed of movement of the moving object as determined from the speed of movement of the camera.

16. The system as claimed in claim 15, wherein the system comprises a gaze detection unit configured to detect a gaze direction of a camera user, wherein the controller is configured to select a central point of the digital viewpoint based on the direction of movement and the detected gaze direction.

17. The system as claimed in claim 15, wherein the controller comprises a processor.

18. A method for selecting a digital viewpoint in a video, the method comprising:

receiving a video stream from a camera, receiving a signal from a movement detection element, the signal comprising information including speed and direction of movement of the camera, the speed corresponding to a speed of a moving object to which the camera is attached, defining a central point in the received video stream based on the direction of movement of the camera, defining a field of view based on the speed of movement of the moving object, and selecting a digital viewpoint in the received video stream with the defined central point and the defined field of view based on the speed of movement of the moving object as determined from the speed of movement of the camera.

19. The method as claimed in claim 18, wherein defining a field of view based on the speed of movement of the camera comprises narrowing the field of view when the speed of movement increases, and widening the field of view when the speed of movement decreases.

20. The method as claimed in claim 18, comprising:

receiving a signal from a gaze detection element, the signal comprising information including gaze direction of a camera user defining an additional central point based on the detected gaze direction, and selecting an additional digital viewpoint in the received video stream with the additional defined central point.

* * * * *